(12) United States Patent
Lillie

(10) Patent No.: US 11,758,935 B2
(45) Date of Patent: Sep. 19, 2023

(54) COFFEE BEAN TEMPERATURE DETECTION DEVICE AND TEMPERATURE MEASURING METHOD THEREOF

(71) Applicant: Aillio Ltd., Taipei (TW)

(72) Inventor: Jonas Lillie, Taipei (TW)

(73) Assignee: Aillio Ltd., Taipei (TW)

( * ) Notice: Subject to any disclaimer, the term of this patent is extended or adjusted under 35 U.S.C. 154(b) by 748 days.

(21) Appl. No.: 16/728,909

(22) Filed: Dec. 27, 2019

(65) Prior Publication Data

US 2020/0205458 A1 Jul. 2, 2020

(30) Foreign Application Priority Data

Jan. 2, 2019 (TW) ................................ 108100081

(51) Int. Cl.
*A23N 12/12* (2006.01)
*A47J 37/06* (2006.01)

(52) U.S. Cl.
CPC ............ *A23N 12/125* (2013.01); *A47J 37/06* (2013.01); *A47J 2202/00* (2013.01)

(58) Field of Classification Search
CPC ...... A47J 37/06; A47J 2202/00; A23N 12/125
USPC .................................... 374/120; 99/342, 358
See application file for complete search history.

(56) References Cited

U.S. PATENT DOCUMENTS

| | | | | |
|---|---|---|---|---|
| 3,765,237 A * | 10/1973 | Blackmer | ............. | G01N 25/00 219/400 |
| 4,420,679 A * | 12/1983 | Howe | ................... | G01N 30/30 219/400 |
| 5,281,786 A * | 1/1994 | Park | ..................... | H05B 6/6411 219/706 |
| 5,286,943 A * | 2/1994 | Has | ......................... | F24C 14/02 706/900 |
| 2002/0005406 A1* | 1/2002 | Fukunaga | ............ | H05B 6/6455 219/711 |
| 2003/0019223 A1* | 1/2003 | Arata | .................. | F04D 25/0666 236/44 C |
| 2007/0134109 A1* | 6/2007 | Peia | .................... | F04D 25/0646 417/420 |
| 2007/0204477 A1* | 9/2007 | Lin | ........................ | A45D 20/12 219/626 |
| 2007/0242723 A1* | 10/2007 | Loose | ..................... | G01K 1/20 374/E13.006 |
| 2009/0060738 A1* | 3/2009 | Chen | ................... | F04D 25/0666 29/889.4 |
| 2012/0180672 A1* | 7/2012 | Yu | ........................ | A23N 12/083 99/342 |

(Continued)

*Primary Examiner* — Jimmy Chou

(74) *Attorney, Agent, or Firm* — Wang Law Firm, Inc.

(57) ABSTRACT

Disclosed is a coffee bean temperature detection device, including an accommodation tube, with two opposite openings, and the opening facing the bean in use is a first opening, and the other opening facing away from the bean is a second opening; a fixing element is fixedly arranged in the accommodation tube but does not contact the accommodation tube; a non-contact thermometer is located in the accommodation tube and fixedly arranged on a surface of the fixing element facing the first opening, with the non-contact thermometer facing the first opening and not in contact with the accommodation tube; and a blowing device is fixedly arranged at end of the second opening, and the blowing device blows in a direction towards the non-contact thermometer.

14 Claims, 13 Drawing Sheets

(56) References Cited

U.S. PATENT DOCUMENTS

| | | | |
|---|---|---|---|
| 2013/0170518 A1* | 7/2013 | Chang | G01M 99/002 374/141 |
| 2013/0330453 A1* | 12/2013 | Doglioni Majer | A47J 31/4403 99/323 |
| 2015/0063979 A1* | 3/2015 | Wang | F04D 29/522 415/48 |
| 2015/0083701 A1* | 3/2015 | Burkhart | B23K 9/1006 219/133 |
| 2015/0366399 A1* | 12/2015 | Lee | A47J 36/38 99/357 |
| 2016/0201550 A1* | 7/2016 | Shieh | F01P 11/14 165/11.1 |
| 2018/0258943 A1* | 9/2018 | Horng | G01K 1/14 |

\* cited by examiner

COFFEE BEAN TEMPERATURE DETECTION DEVICE AND TEMPERATURE MEASURING METHOD THEREOF

CROSS-REFERENCE TO RELATED APPLICATION

This application claims the priority of Taiwanese patent application No. 108100081, filed on Jan. 2, 2019, which is incorporated herewith by reference.

BACKGROUND OF THE INVENTION

1. Field of the Invention

The present invention relates generally to a coffee bean temperature detection device and a temperature measuring method thereof.

2. The Prior Arts

During roasting coffee beans, the green coffee beans can swell and change the color, texture, taste, aroma and density, thus producing a special flavor for the coffee. In this process, how to measure the temperature and state of the coffee bean and to adjust the roasting time and the intensity of the heat are the key factors affecting the flavor of coffee.

Therefore, in order to measure the temperature of coffee beans, the prior art measures the temperature of beans with a contact thermometer. However, when roasting coffee beans, a large amount of impurities, such as peels and oil stains, are produced. These impurities will adhere to the thermometer to form interference and make the measurement inaccurate. Therefore, conventional contact thermometers need frequent cleaning in order to maintain the measurement accuracy. In addition, the contact thermometers used in the prior art will take more time due to slower reaction time to temperature measurement, which will cause distortion of the temperature measurement results.

SUMMARY OF THE INVENTION

A primary objective of the present invention is to provide a coffee bean temperature detection device, able to substantially eliminate the problems caused by the limitations and disadvantages of the prior art.

In view of the objective of the present invention, the present invention provides a coffee bean temperature detection device, which comprises an accommodation tube, with two opposite openings, and the opening facing the bean in use is a first opening, and the other opening facing away from the bean is a second opening; a fixing element is fixedly arranged in the accommodation tube by a plurality of fixing pins but does not completely contact the accommodation tube; a non-contact thermometer is located in the accommodation tube and fixedly arranged on a surface of the fixing element facing the first opening, with the non-contact thermometer facing the first opening and not in contact with the accommodation tube; and a blowing device is fixedly arranged at end of the second opening, and the blowing device blows in a direction towards the non-contact thermometer.

In an embodiment, the fixing element has a fixing base and a plurality of fixing pins around the fixing base, and the plurality of fixing pins are separated from one another.

In another embodiment, the accommodation tube is provided with a nozzle at the first opening, with a diameter gradually decreasing toward a direction away from the second opening; and the accommodation tube also has a diameter gradually decreases in a direction away from the second opening.

In another embodiment, the nozzle and the first opening are integrally formed.

In another embodiment, the non-contact thermometer is an infrared thermometer.

In another embodiment, the blowing device comprises a motor and a fan driven by the motor.

In another embodiment, the coffee bean temperature detection device of the present invention further comprises a sound receiving device, located in the accommodation tube and fixedly disposed on a side of the fixing element facing the first opening, located beside the non-contact thermometer and not in contact with the accommodation tube.

The present invention further comprises an electronic component fixing base, fixedly disposed outside the accommodation tube, and one or a combination of the electrically connected non-contact thermometer, the blowing device, and the sound receiving device are fixedly disposed on the electronic component fixing base.

In another embodiment, the present invention further comprises a display, connected to and receiving signal from the infrared thermometer and the sound receiving device.

The present invention also provides a method for measuring the temperature of coffee bean, which comprises: providing a non-contact thermometer in an accommodation tube, so that the non-contact thermometer facing a first opening of the accommodation tube but not in contact with the accommodation tube; providing a blowing device blowing in a direction of the first opening at a second opening at the opposite end of the accommodation tube; activating the blowing device and the non-contact thermometer to make the blowing device generate airflow around the non-contact thermometer and blown out of the first opening; as such, the airflow keeps the interference source away from the non-contact thermometer, and then the temperature of the coffee bean is measured by the non-contact thermometer.

With the present invention, the user can reduce the frequency of cleaning the coffee bean temperature detection device, and the influence of the interference source on the measurement is also reduced. In addition, an infrared thermometer with a fast temperature measurement response can reduce the temperature measurement reaction time to avoid distortion of the temperature measurement result.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
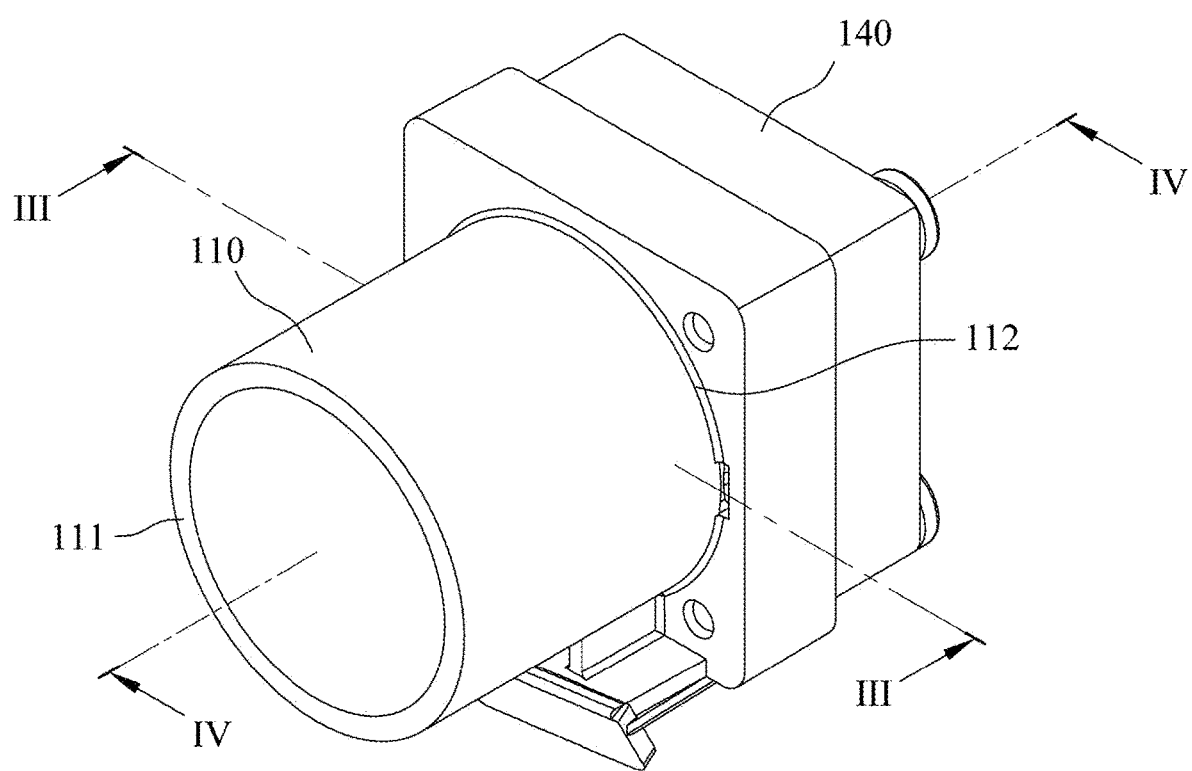
FIG. 1 is a schematic front view of a coffee bean temperature detection device according to an embodiment consistent with the principles described in the present invention.

The accompanying drawings are included to provide a further understanding of the invention, and are incorporated in and constitute a part of this specification. The drawings illustrate embodiments of the invention and, together with the description, serve to explain the principles of the invention. Wherever possible, the same part numbers will be used throughout the drawings to refer to the same or like parts.

The advantages and features of the present invention and the method of implementation will be clarified by the embodiments described in the following drawings. The invention may, however, be embodied in different forms and should not be construed as limited to the embodiments set forth herein. On the contrary, providing these embodiments will make the present invention more thorough and complete, and can completely convey the scope of the present invention to those skilled in the art. In addition, the present invention is limited only by the scope of the patent application.

The shapes, sizes, ratios, angles, and numbers of the embodiments of the present invention disclosed in the drawings are merely examples, and therefore, the present invention is not limited to the details of the drawings. In the following description, when it is determined that a detailed description related to a known function or configuration may unnecessarily obscure the focus of the present invention, the detailed description will be omitted.

Unless the description of "only" is used, when the descriptions of "including", "having" and "comprising" are used in this specification, other elements may be added. Unless otherwise stated, terms in the singular can include the plural.

In explaining an element, although not explicitly stated, the element is interpreted to include an error range.

When describing the positional relationship, for example, when the positional relationship between two parts is described as "up", "upper", "bottom", "lower" and "aside", one or more other elements may be disposed between the two components, unless "only" or "direct" descriptions are used.

Hereinafter, examples and embodiments of a multi-purpose coffee bean temperature detection device according to the present invention will be described in detail with reference to the accompanying drawings.

Figure 2:
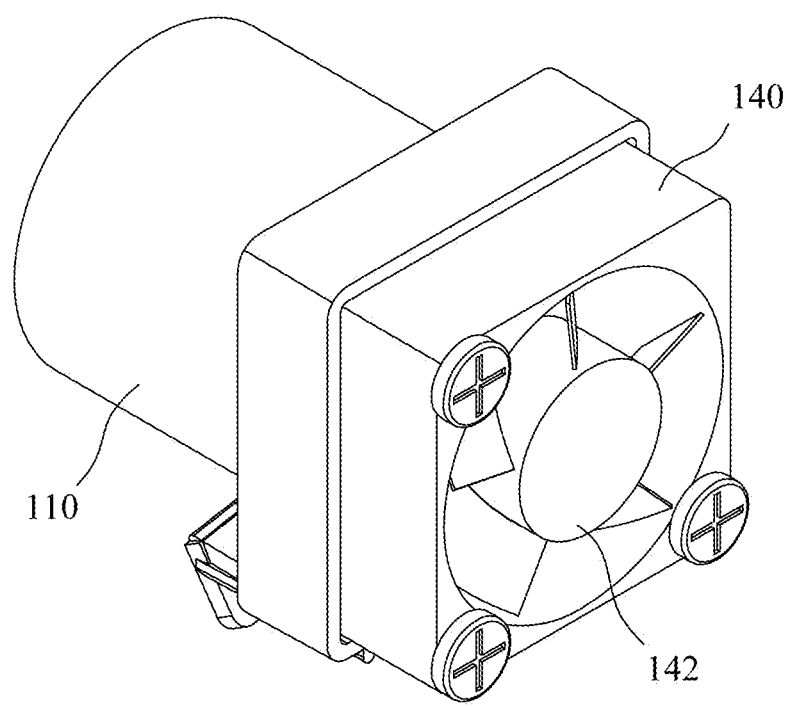
FIG. 2 is a schematic rear view of the coffee bean temperature detection device of the present invention.

FIG. 1 is a schematic front view showing a coffee bean temperature detection device according to an embodiment consistent with the principles described in the present invention. FIG. 2 is a schematic rear view of the coffee bean temperature detection device of the present invention. As shown in FIGS. 1 and 2, the coffee bean temperature detection device comprises an accommodation tube 110 and a blowing device 140. The accommodation tube 110 comprises a first opening 111 facing the coffee beans when in use and a second opening 112 opposite to the first opening 111. The blowing device 140 is located at the end of the second opening 112, and blows towards the first opening 111. The blowing device 140 comprises a fan 142 and a motor (not shown) disposed therein.

Figure 3:
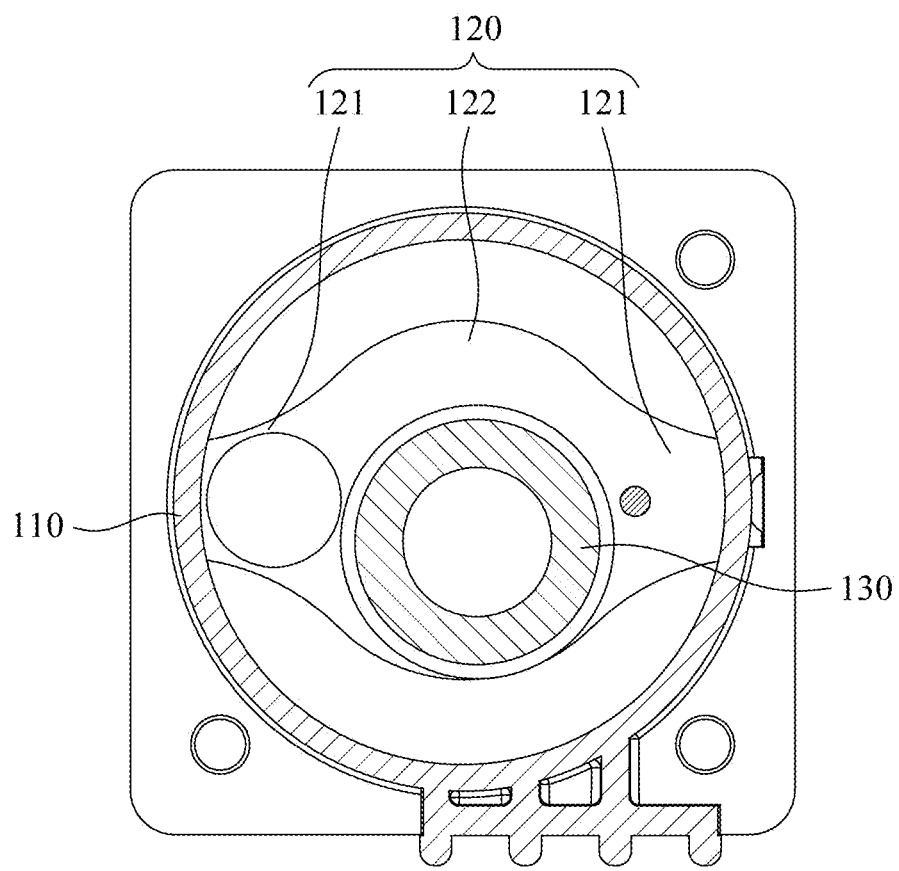
FIG. 3 is a cross-sectional view of the coffee bean temperature detection device of the present invention, along line in FIG. 1.
Figure 4:
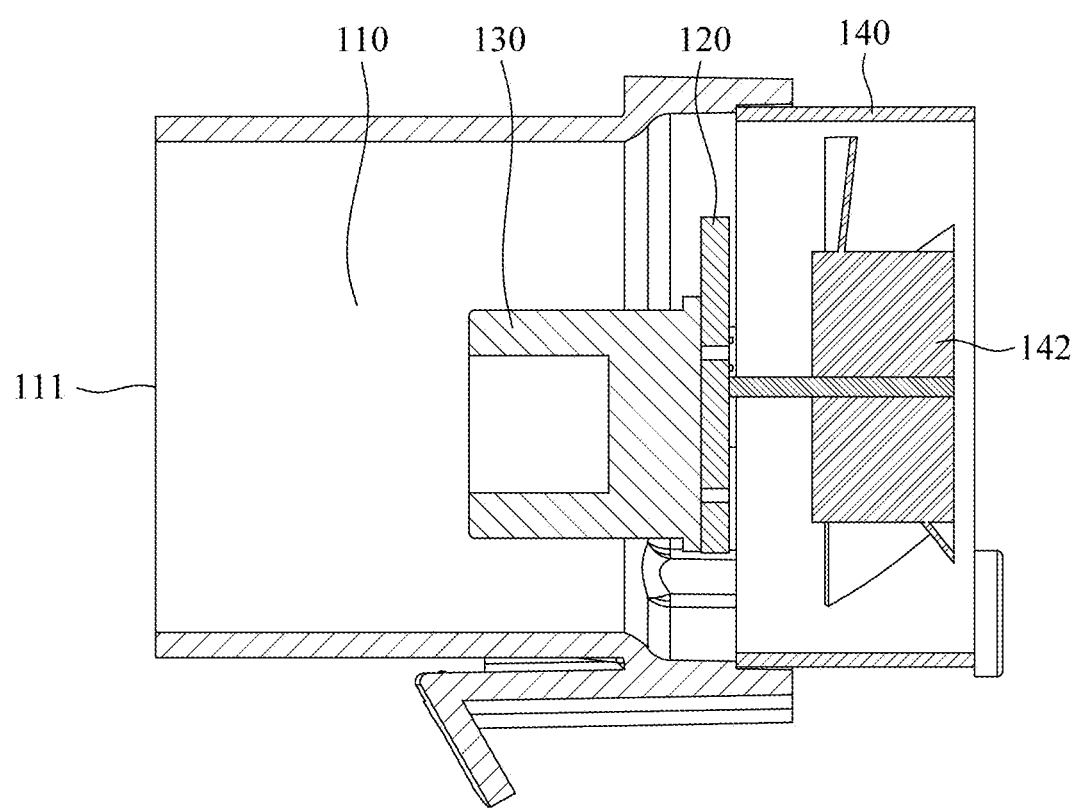
FIG. 4 is a cross-sectional view of the coffee bean temperature detection device of the present invention, along line IV-IV in FIG. 1.
Figure 5:
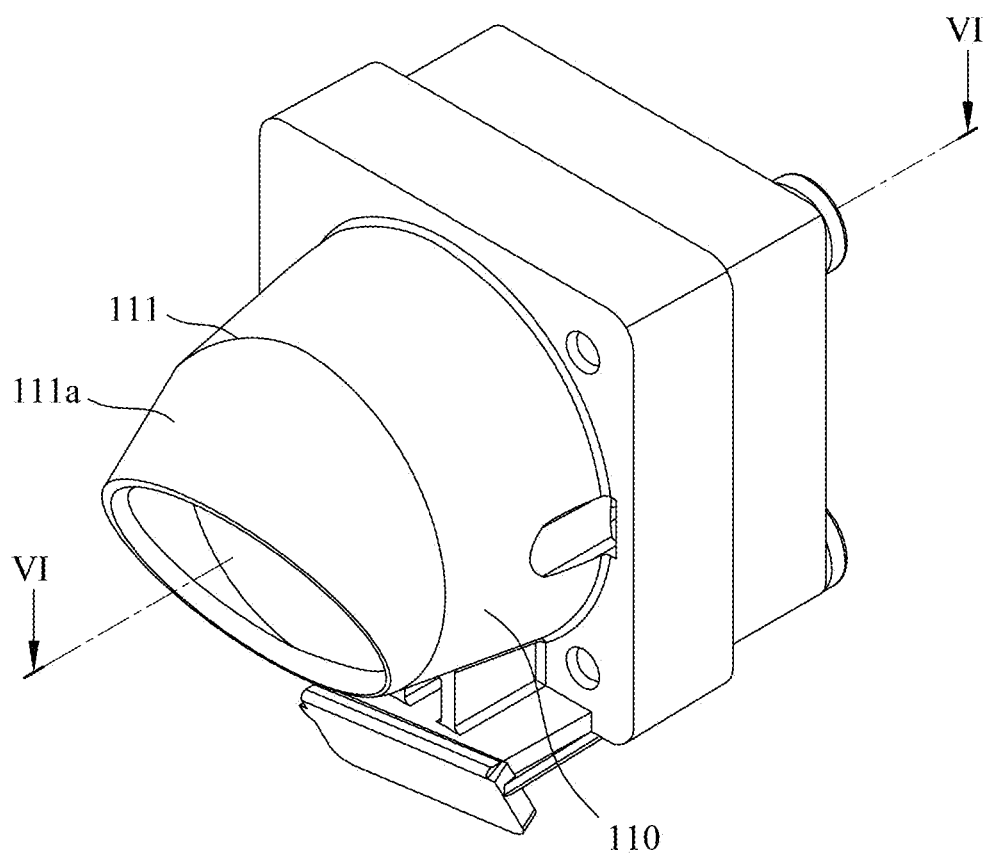
FIG. 5 is a schematic view of the coffee bean temperature detection device of another embodiment of the present invention with a nozzle.

FIG. 3 is a cross-sectional view of the coffee bean temperature detection device of the present invention, along line in FIG. 1; FIG. 4 is a cross-sectional view of the coffee bean temperature detection device of the present invention, along line IV-IV in FIG. 1. As shown in FIGS. 3 and 4, a fixing element 120 and a non-contact thermometer 130 are disposed inside the accommodation tube 110. The fixing element 120 has a fixing base 122 and a plurality of fixing pins 121 surrounding the fixing base 122. The plurality of fixing pins 121 are spaced apart from one another, and a plurality of fixing pins 121 are fixedly disposed in the accommodation tube 110, and the fixing base 122 is not in contact with the accommodation tube 110. The non-contact thermometer 130 is located in the accommodation tube 110 and is fixedly disposed on a surface of the fixing element 120 facing the first opening, but is not in contact with the accommodation tube 110. The non-contact thermometer 130 can measure the temperature of the object without contacting the object to be measured, thereby avoiding contact with the pollution or interference source. In addition, because the infrared thermometer's temperature response is faster, especially faster than traditional contact thermometers, the non-contact thermometer 130 can be preferably an infrared thermometer to reduce the time required for temperature measurement as well as avoid distortion of temperature measurement results. The airflow generated by the blowing device 140 blowing passes around the plurality of fixing pins 121 and the non-contact thermometer 130 to blow out the first opening 111. This airflow will reduce the interference of the peel bits from the coffee beans and oil stains generated by the coffee bean during the roasting process stuck on the non-contact thermometer 130 to protect the non-contact thermometer 130 to reduce the cleaning frequency and the impact of interference sources on the measurement. FIG. 5 is a schematic view showing the present invention comprising a nozzle 111*a* according to another embodiment. As shown in FIG. 5, the nozzle 111*a* is disposed on the first opening 111, and the diameter of the nozzle 111*a* is gradually reduced in a direction away from the second opening 112, so as to channel the airflow generated by the blowing device 140 on the non-contact thermometer 130 and increase the wind pressure to improve the protection. In addition, the diameter of the accommodation tube 110 may also be gradually reduced in a direction away from the second opening 112 to further improve the protection effect. In addition, the nozzle 111a and the first opening 111 may be integrally formed.

Figure 6:
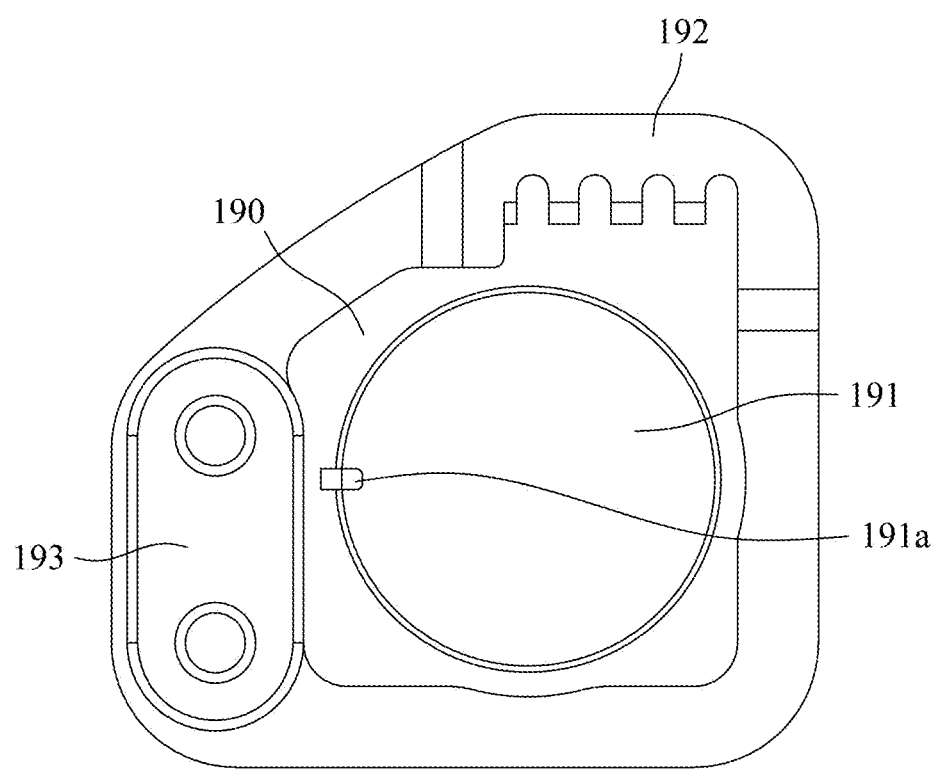
FIG. 6 is a schematic view of the fixing structure of the coffee bean temperature detection device of the present invention.
Figure 7:
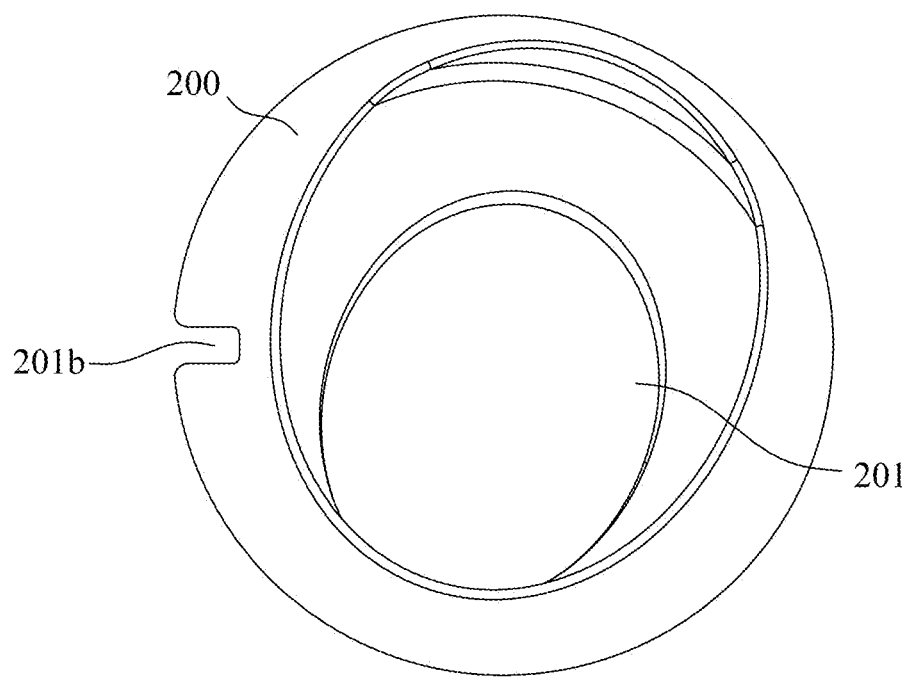
FIG. 7 is a schematic view of the sealing sleeve of the coffee bean temperature detection device of the present invention.
Figure 8:
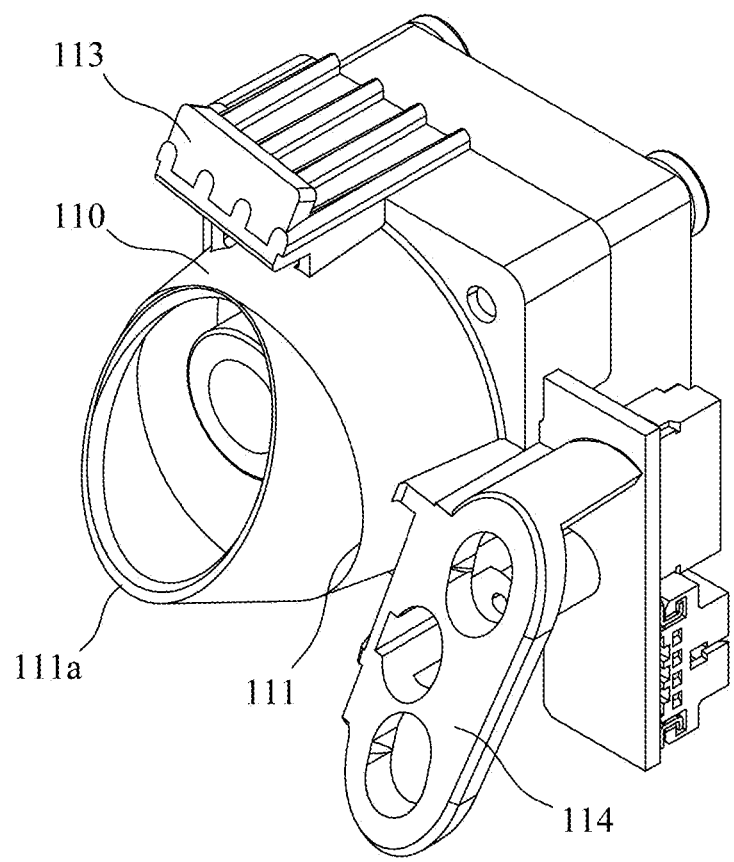
FIG. 8 is a schematic view of the fixing buckle and the second fixing base of the coffee bean temperature detection device of the present invention.
Figure 9:
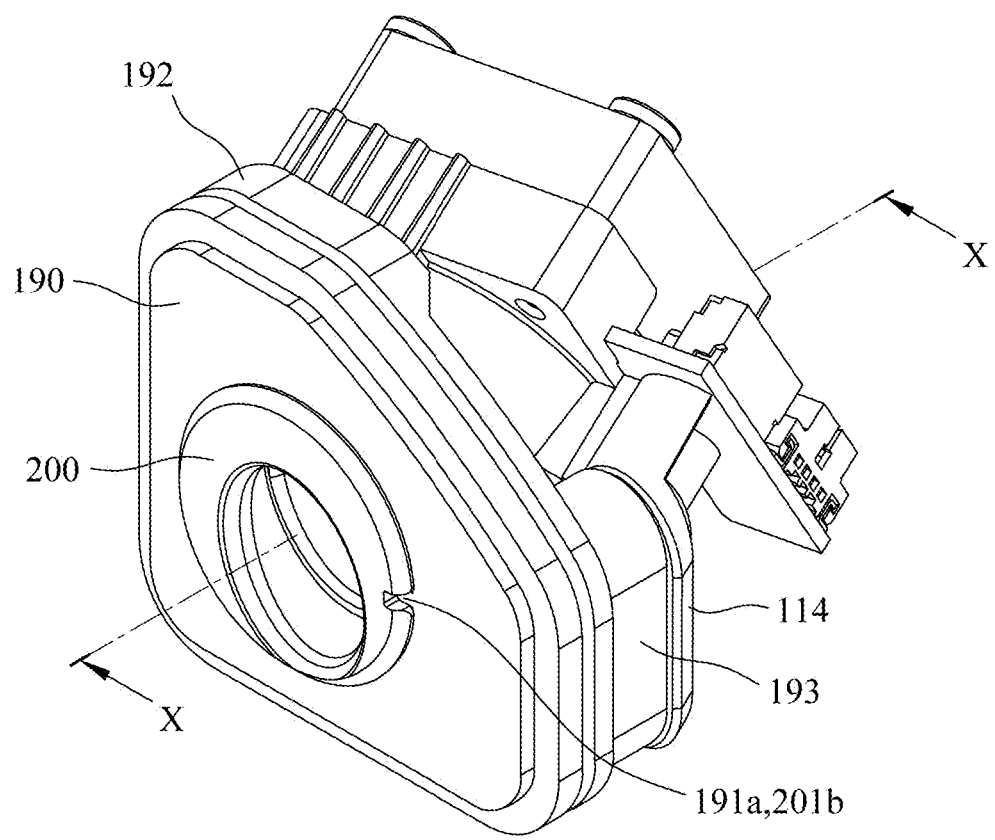
FIG. 9 is a schematic view of the assembly of the fixing structure and the sealing sleeve of the coffee bean temperature detection device of the present invention.
Figure 10:
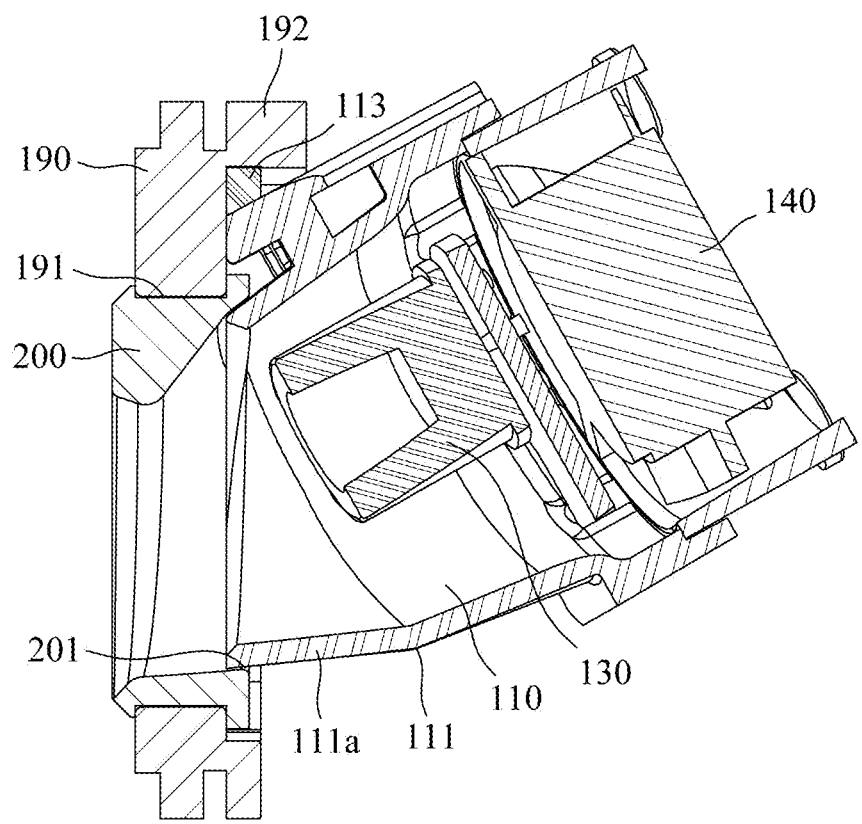
FIG. 10 is a cross-sectional view of the coffee bean temperature detection device of the present invention, along line X-X in FIG. 9.

FIG. 6 is a schematic view of the fixing structure of the coffee bean temperature detection device of the present invention; FIG. 7 is a schematic view of the sealing sleeve of the coffee bean temperature detection device of the present invention; FIG. 8 is a schematic view of the fixing buckle and the second fixing base of the coffee bean temperature detection device of the present invention; FIG. 9 is a schematic view of the assembly of the fixing structure and the sealing sleeve of the coffee bean temperature detection device of the present invention; FIG. 10 is a cross-sectional view of the coffee bean temperature detection device of the present invention, along line X-X in FIG. 9. As shown in FIGS. 6-10, the coffee bean temperature detection device comprises a fixing structure 190, which is placed in a hole (not shown) on a bean roasting container that works with the fixing structure 190 and is tightly engaged to the hole to prevent air leakage. One side of the fixing structure 190 faces the inside of the bean roasting container, and the other side faces the outside of the bean roasting container. The fixing structure 190 has a first hole 191, a fixing slot 192, and a first fixing base 193. One side of the fixing structure 190 with the first hole 191 faces the inside of the bean roasting container and the other side of the fixing structure 190 with the first hole 191 faces the outside of the bean roasting container, the fixing slot 192 and the first fixing base 193 are located on the side of the fixing structure 190 facing the outside of the bean roasting container . . . . A protruding portion 191a is formed on an circumference of the first hole 191. A seal ring 200 has an outer diameter matched with an inner diameter of the first hole 191, and has a recessed portion 201b fitted with the protruding portion 191a. The sealing ring 200 is tightly sleeved in the first hole 191 of the fixing structure 190, and the recessed portion 201b and the protruding portion 191a are engaged with each other. The sealing ring 200 has a second hole 201. One side of the second hole 201 is toward the inside of the bean roasting container and the other side is toward the outside of the bean roasting container. The second hole 201 matches the nozzle 111a (or the first opening 111). The accommodation tube 110 has a fixing buckle 113 and a second fixing base 114 pointing to the first opening 111. The fixing buckle 113 is matched with the fixing slot 192, and the first fixing base 193 is matched with the second fixing base 114. The combination of the first fixing base 193 and the second fixing base 114 through the fastening of the fixing buckle 113 and the fixing slot 192 and a fastening member (not shown) makes the nozzle 111a (or the first opening 111) press tightly against the second hole 201 to air-tight to prevent air leakage, so that the airflow generated by the blowing device 140 is concentrated in front of the non-contact thermometer 130, without leaking to elsewhere. The fastening member may be a screw, a buckle, a clamp, or the like, so as to achieve the effect of combining the first fixing base 193 and the second fixing base 114. In addition, the fixing structure 190 and the sealing ring 200 are made of a silicone rubber that can withstand the high temperature when roasting the coffee bean.

Figure 11:
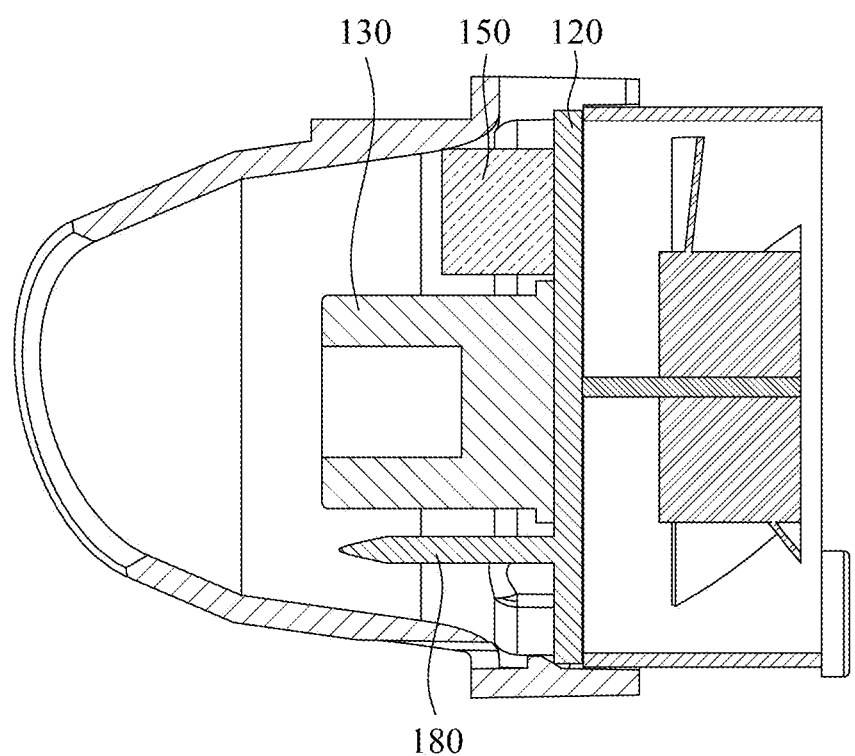
FIG. 11 is a cross-sectional view of the coffee bean temperature detection device of another embodiment of the present invention with a sound receiving device.

FIG. 11 is a cross-sectional view of another embodiment having a sound receiving device 150 and an electrostatic de-dusting device 180 according to the present invention. As shown in FIG. 11, the coffee bean temperature detection device may further comprise a sound receiving device 150, which is located in the accommodation tube 110 and is fixedly disposed on a side of the fixing element 120 facing the first opening 111 without contact with the accommodation tube 110, and located next to the non-contact thermometer 130. When roasting the coffee beans, the crackling sound of the beans is an important indicator for judging the progress of roasting, and the sound receiving device 150 can quantify the volume and the rhythm frequency of the crackling sound to assist the user's judgment. In addition, the coffee bean temperature detection device may further comprise an electrostatic de-dusting device 180, which is located in the accommodation tube 110 and is fixedly disposed on a side of the fixing element 120 facing the first opening 111 without contact with the accommodation tube 110, and the electrostatic de-dusting device 180 located next to the non-contact thermometer 130. The electrostatic de-dusting device 180 is used to make the interference source electrostatic and become adsorbed elsewhere (such as a container containing beans) to further reduce the impact of the interference source on the measurement accuracy.

In addition, the present invention further comprises a display device (not shown) connected to receive the signal of the non-contact thermometer 130 and the sound receiving device 150. The data received from the non-contact thermometer 130 and the sound receiving device 150 are compared with preset thresholds to determine whether to display a notification to inform the user.

Figure 12:
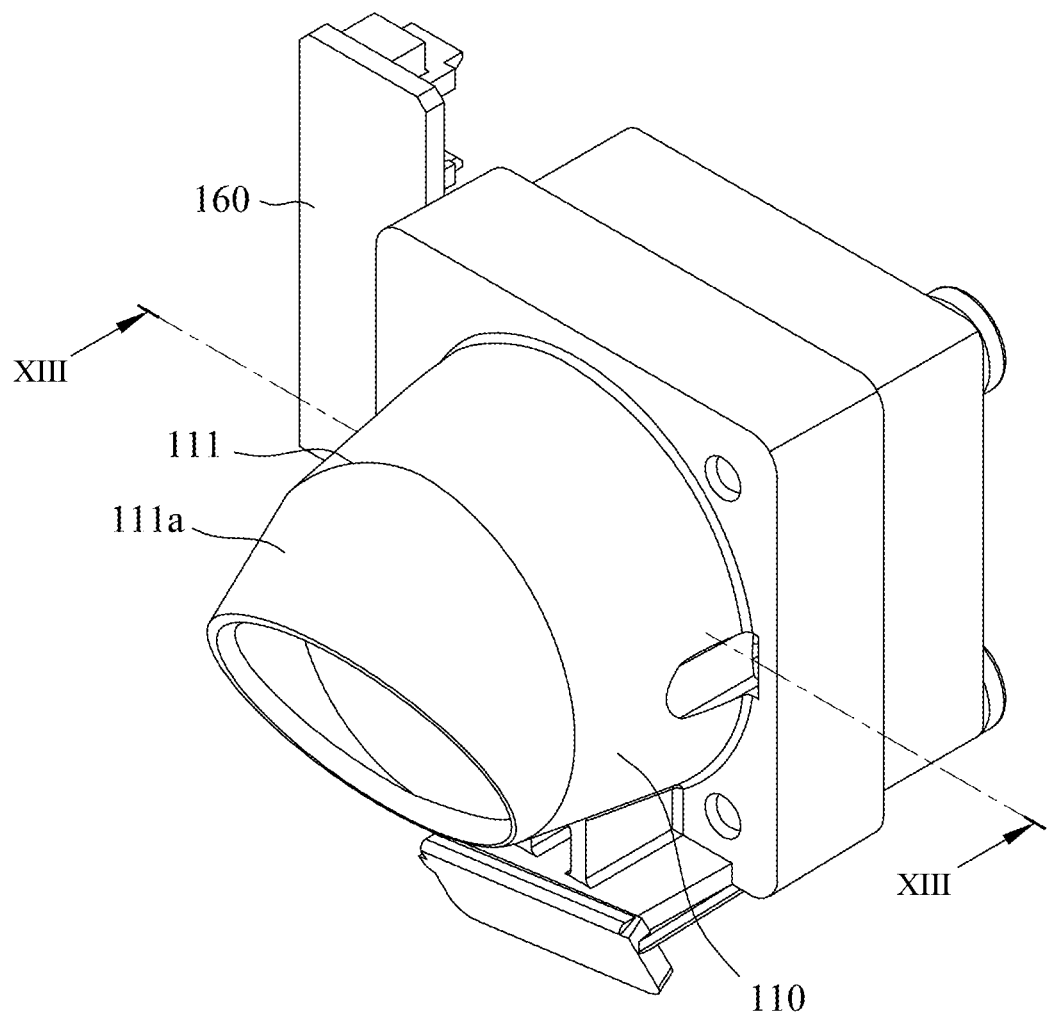
FIG. 12 is a schematic view of the coffee bean temperature detection device of another embodiment of the present invention with electronic components and a fixing base.
Figure 13:
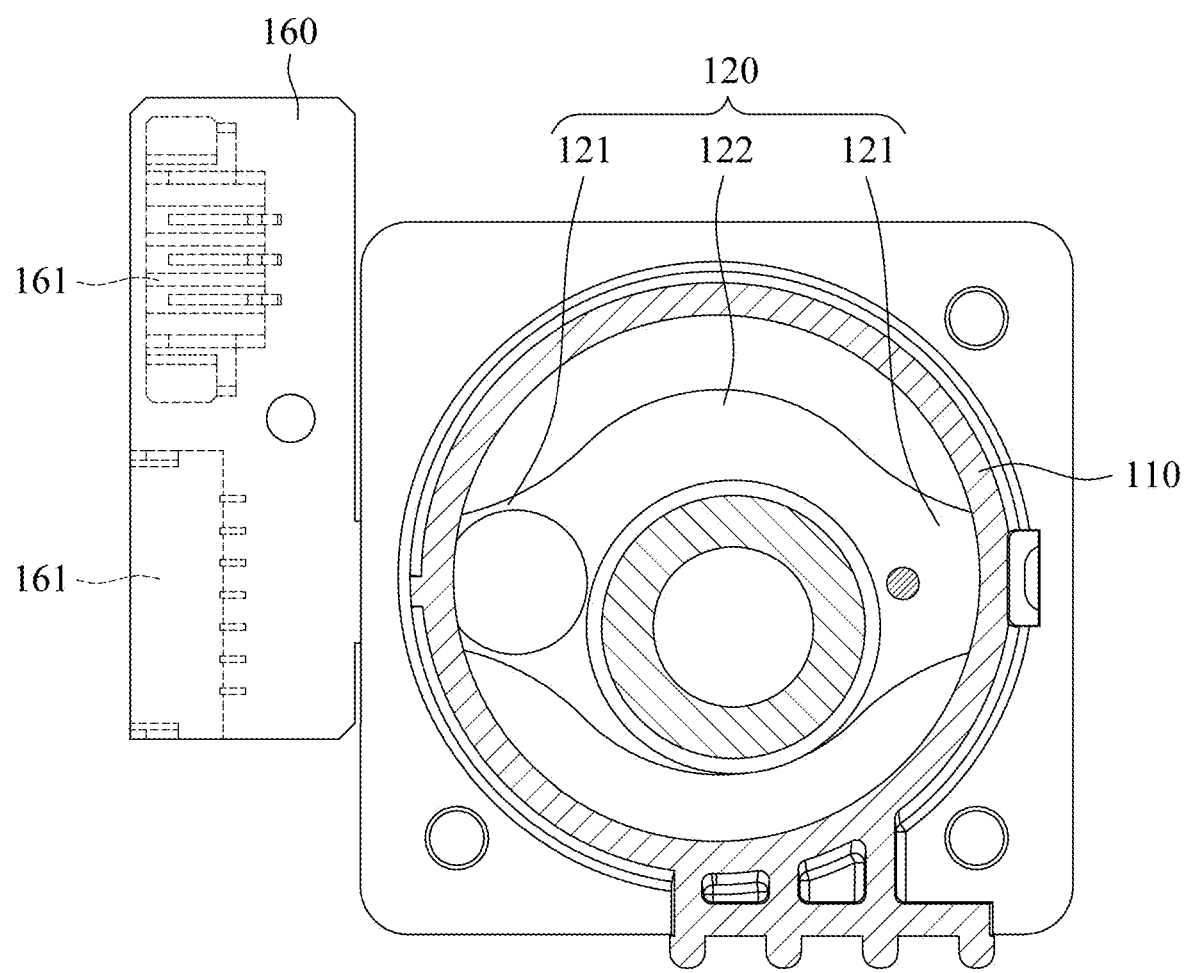
FIG. 13 is a cross-sectional view of the coffee bean temperature detection device of another embodiment of the present invention with the electronic components and the fixing base, along line XIII-XIII in FIG. 12.

FIG. 12 is a schematic view of the coffee bean temperature detection device of another embodiment of the present invention with electronic components and fixing base; FIG. 13 is a cross-sectional view of the coffee bean temperature detection device of another embodiment of the present invention with electronic components and fixing base, along line XIII-XIII in FIG. 12. As shown in FIGS. 12 and 13, the coffee bean temperature detection device comprises an electronic component fixing base 160 and an electronic component 161, which are fixedly disposed outside the accommodation tube 110. The electronic component 161 is electrically connected to one or a combination of the non-contact thermometer 130, the blowing device 140, and the sound receiving device 150, and is fixedly disposed on the electronic component fixing base 160. In addition, the electronic component fixing base 160 may be integrally formed with the accommodation tube 110. In addition, in other embodiments, one of the plurality of fixing pins 121 can protrude out of the accommodation tube 110, and the electronic component fixing base 160 may be integrally formed therewith.

According to other embodiments of the principles described herein, a method for measuring the temperature of coffee beans is provided, the method comprising:

providing a non-contact thermometer in an accommodation tube, so that the non-contact thermometer facing a first opening of the accommodation tube but not in contact with the accommodation tube;

providing a blowing device blowing in a direction of the first opening at a second opening at the opposite end of the accommodation tube;

activating the blowing device and the non-contact thermometer to make the blowing device generate airflow around the non-contact thermometer and blown out of the first opening; as such, the airflow keeps the interference source away from the non-contact thermometer, and then the temperature of the coffee bean is measured by the non-contact thermometer;

Wherein, the non-contact thermometer is preferably an infrared thermometer.

Accordingly, the present invention has the following practical effects and technical effects:

First, the user can measure the temperature of the bean with the present invention.

Second, the non-contact thermometer and blowing device of the present invention can prevent the pollution or interference source from contacting the non-contact thermometer to interfere with the measurement, thereby reducing the cleaning frequency.

Third, the non-contact thermometer, which is preferably an infrared thermometer, has the effect of fast temperature response to avoid distortion of the temperature measurement result.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A coffee bean temperature detection device, comprising:
    a fixing structure, tightly engaged to a bean roasting container, and the fixing structure disposed with a fixing slot, a first fixing base, and a first hole, one side of the fixing structure with the first hole facing inside of the bean roasting container and the other side of the fixing structure with the first hole facing outside of the bean roasting container, the fixing structure comprising a protruding portion on a circumference of the first hole;
    a sealing ring having an outer diameter matched with an inner diameter of the first hole, and comprising a recessed portion on an outer circumference, the recessed portion matched with the protruding portion of the first hole, and the sealing ring being sleeved tightly in the first hole of the fixing structure, with the recessed portion engaged with the protruding portion on the circumference of the first hole, the sealing ring being disposed with a second hole;
    an accommodation tube with two opposite openings, and the opening facing coffee beans in roasting is a first opening, and the other opening facing away from the coffee beans being a second opening; the accommodation tube disposed with a fixing buckle and a second fixing base pointing to the first opening, with engagement between the fixing buckle and the fixing slot, and combining the first fixing base and the second fixing base, the first opening being tightly pressed against the second hole;
    a fixing element fixedly arranged in the accommodation tube by a plurality of fixing pins but the fixing element not being completely in contact with the accommodation tube;
    a non-contact thermometer located in the accommodation tube and fixedly arranged on a surface of the fixing element facing the first opening, with the non-contact thermometer facing the first opening and not in contact with the accommodation tube; and
    a blowing device fixedly arranged at end of the second opening, and the blowing device blowing in a direction towards the non-contact thermometer.

2. The coffee bean temperature detection device according to claim 1, wherein the fixing structure and the sealing ring are made of silicon rubber.

3. The coffee bean temperature detection device according to claim 2, wherein the fixing element comprises a fixing base and a plurality of fixing pins around the fixing base, and the plurality of fixing pins are separated from one another.

4. The coffee bean temperature detection device according to claim 2, wherein the accommodation tube is provided with a nozzle at the first opening, with a diameter gradually decreasing toward a direction away from the second opening.

5. The coffee bean temperature detection device according to claim 4, wherein the accommodation tube has a diameter gradually decreases in a direction away from the second opening.

6. The coffee bean temperature detection device according to claim 5, wherein the nozzle and the first opening are integrally formed.

7. The coffee bean temperature detection device according to claim 6, wherein the non-contact thermometer is an infrared thermometer.

8. The coffee bean temperature detection device according to claim 7, wherein the blowing device comprises a motor and a fan driven by the motor.

9. The coffee bean temperature detection device according to claim 8, further comprising a sound receiving device located in the accommodation tube and fixedly disposed on a side of the fixing element facing the first opening, the sound receiving device located beside the non-contact thermometer and not in contact with the accommodation tube.

10. The coffee bean temperature detection device according to claim 9, further comprising an electronic component fixing base fixedly disposed outside the accommodation tube, and one or a combination of the electrically connected non-contact thermometer, the blowing device, and the sound receiving device are fixedly disposed on the electronic component fixing base.

11. The coffee bean temperature detection device according to claim 10, further comprising a display connected to and receiving signals from the infrared thermometer and the sound receiving device.

12. The coffee bean temperature detection device according to claim 11, wherein the electronic component fixing base and the accommodation tube are integrally formed.

13. The coffee bean temperature detection device according to claim 12, wherein one of the plurality of fixing pins protrudes from the accommodation tube and is integrally formed with the electronic component fixing base.

14. The coffee bean temperature detection device according to claim 13, further comprising an electrostatic de-dusting device located in the accommodation tube and fixedly disposed on a side of the fixing element facing the first opening without contact with the accommodation tube, and the electrostatic de-dusting device located next to the non-contact thermometer.

* * * * *